Oct. 9, 1956

J. O. JOHNSON 2,765,522

KEY PULLER

Filed July 21, 1953

John Oscar Johnson
INVENTOR.

BY *Clarence A. O'Brien
and Harvey B. Jacobson*
Attorneys

United States Patent Office 2,765,522
Patented Oct. 9, 1956

2,765,522

KEY PULLER

John Oscar Johnson, Forgan, Saskatchewan, Canada

Application July 21, 1953, Serial No. 369,484

2 Claims. (Cl. 29—250)

The present invention relates to new and useful improvements in key pullers for pulling keys used for connecting pulleys and other parts of machinery to shafts.

An important object of the invention is to provide effective means for easily and quickly pulling the keys of pulleys and the like without danger of damage to the parts of the machinery.

A further object is to provide a feed screw for supplying the pulling force and which carries connecting means to engage the key, and wherein the connecting means is adjustable to facilitate engagement with the key.

Another object is to provide a device of this character of simple and practical construction, which is efficient and reliable in operation, strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
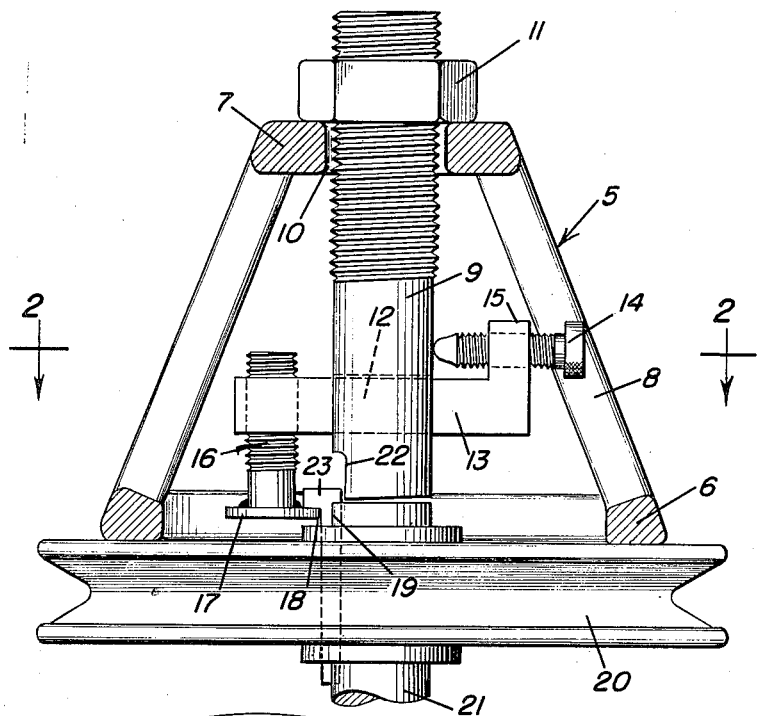
Figure 1 is a side elevational view with parts shown in section.
Figure 2:
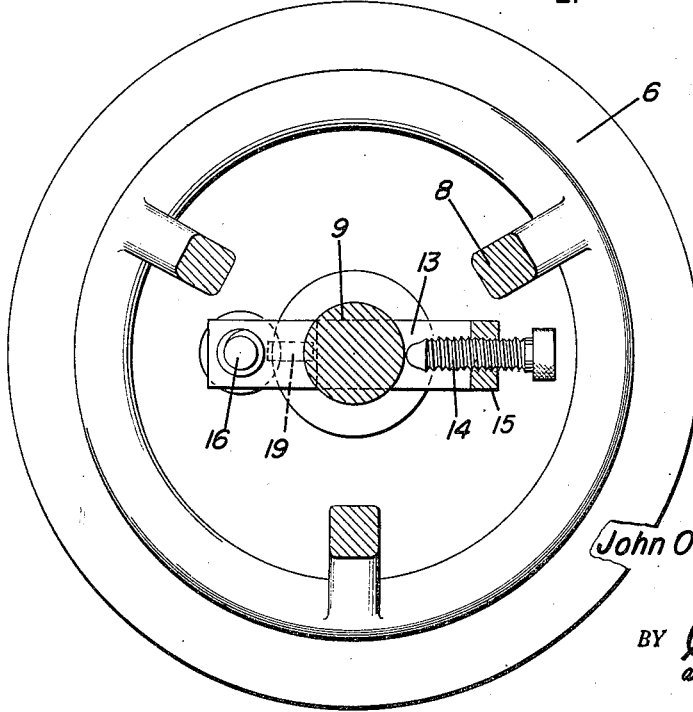
Figure 2 is a sectional view taken on a line 2—2 of Figure 1.

Referring now to the drawing in detail, wherein for the purpose of illustration I have disclosed a preferred embodiment of my invention, the numeral 5 designates a frame of substantially truncated cone shape and including a base ring 6, a top or outer ring 7 of reduced diameter and legs 8 connecting the rings in spaced parallel relation to each other.

A feed screw 9 passes freely through the opening 10 in outer ring 7 and a nut 11 is threaded on the outer end of the screw to bear against the ring. The inner end of the screw is formed with a transverse slot 12 in which a transversely disposed connector bar 13 is slidable. A set screw 14 is threaded in a lug 15 at one end of the bar and in a position at right angles to feed screw 9 and a second screw 16 is threaded transversely in the other end of the bar at right angles to set screw 14 and parallel to and at an opposite side of feed screw 9 from set screw 14. Screw 16 is provided with a flat head 17 adapted to engage behind the shoulder 18 of a key 19 used for locking a pulley 20 on a shaft 21.

In the operation of the device, base ring 6 is placed against the outer surface of pulley 20 and with the inner end of screw 9 alined with shaft 21. Connecting bar 13 is then adjusted in slot 12 of screw 9 and pulled in a direction to engage head 17 behind the shoulder 18 of key 19. The pressure of set screw 14 pulls the connecting bar 13 transversely in slot 12 to maintain head 17 engaged with the key.

Nut 11 is then tightened to pull screw 9 outwardly and thus pull the key from the shaft and pulley. Screw 14 strikes the leg 8 to keep screw 9 from turning.

The inner end of screw 9 is formed with a flat side 22 which is engaged by the head 23 of key 19 to prevent bending of said head and avoid slipping of head 23 from head 17 while pulling the key.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A shaft key puller comprising a truncated cone-shaped frame, a vertical feed screw slidable in the top of the frame, a nut threaded on the upper end of the feed screw and bearing against the top of the frame, said screw having a slot, a bar slidably supported in the slot transversely of the screw, a key engaging member carried at one end of the bar parallel to the screw, and pressure means carried at the other end of the bar to adjust the bar in the slot in a direction to maintain the key engaging member engaged with the key.

2. A shaft key puller comprising a truncated cone-shaped frame, a vertical feed screw slidable in the top of the frame, a nut threaded on the upper end of the feed screw and bearing against the top of the frame, said screw having a slot, a bar slidably supported in the slot transversely of the screw, a key engaging member adjustably carried at one end of the bar and including a flange adapted for engagement with the key, and a set screw carried by the other end of the bar and bearing against the feed screw to slide the bar in a direction for tightening the key engaging member with the key.

References Cited in the file of this patent

UNITED STATES PATENTS

| | | |
|---|---|---|
| 977,018 | Kopietz | Nov. 29, 1910 |
| 1,060,872 | Wilson | May 6, 1913 |
| 1,273,484 | Hammar | July 23, 1918 |
| 2,421,324 | Graham | May 27, 1947 |